(12) United States Patent  (10) Patent No.: US 8,839,091 B2
Ramamurthy et al.  (45) Date of Patent: Sep. 16, 2014

(54) PRESENTING FACETED DATA ON A USER INTERFACE

(75) Inventors: Adarsh Ramamurthy, Bangalore (IN); Deepak M. Srinivasa, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 12/968,449

(22) Filed: Dec. 15, 2010

(65) Prior Publication Data

US 2012/0159301 A1  Jun. 21, 2012

(51) Int. Cl.
*G06F 17/20* (2006.01)
*G06F 17/30* (2006.01)

(52) U.S. Cl.
CPC ............................. *G06F 17/30716* (2013.01)
USPC ........................................................ 715/227

(58) Field of Classification Search
CPC ............................................ G06F 17/20–17/21
USPC ........................................................ 715/227
See application file for complete search history.

(56) References Cited

U.S. PATENT DOCUMENTS

| 6,307,573 | B1 | 10/2001 | Barros |
| 6,529,900 | B1 | 3/2003 | Patterson et al. |
| 7,707,140 | B2 | 4/2010 | Leishman et al. |
| 7,730,059 | B2 | 6/2010 | Behnen et al. |
| 8,219,593 | B2 * | 7/2012 | Tunkelang et al. ........... 707/803 |
| 2006/0004703 | A1 | 1/2006 | Spivack et al. |
| 2006/0106876 | A1 | 5/2006 | MacGregor |
| 2007/0043699 | A1 | 2/2007 | Zhang |
| 2008/0005677 | A1 | 1/2008 | Thompson |
| 2008/0133473 | A1 | 6/2008 | Broder et al. |
| 2008/0294678 | A1 | 11/2008 | Gorman et al. |
| 2009/0119262 | A1 | 5/2009 | Guo et al. |
| 2009/0222412 | A1 | 9/2009 | Lee et al. |
| 2009/0265373 | A1 | 10/2009 | Acevedo-Aviles et al. |
| 2010/0036790 | A1 * | 2/2010 | Sweeney et al. ................ 706/48 |
| 2010/0114941 | A1 | 5/2010 | Von Kaenel et al. |
| 2010/0125813 | A1 | 5/2010 | Choudhury |
| 2010/0274674 | A1 * | 10/2010 | Roberts et al. ............. 705/14.73 |
| 2011/0282855 | A1 * | 11/2011 | Ronen et al. .................. 707/706 |
| 2012/0011129 | A1 * | 1/2012 | van Zwol et al. ............. 707/748 |
| 2012/0030152 | A1 * | 2/2012 | Pueyo et al. .................... 706/12 |
| 2012/0053986 | A1 * | 3/2012 | Cardno et al. ............... 705/7.29 |
| 2012/0054226 | A1 * | 3/2012 | Cao et al. ...................... 707/769 |

(Continued)

OTHER PUBLICATIONS

Ruger et al., Zoom Navigation Exploring Large Information and Application Spaces, ACM, AVI '96 Gubbio Italy, p. 40-48.*

(Continued)

*Primary Examiner* — Frank D Mills
(74) *Attorney, Agent, or Firm* — Law Office of Jim Boice

(57) ABSTRACT

A computer implemented method, system and/or computer program product presents data on a user interface. Tabular data for a particular type of data is converted into faceted data. The tabular data is stored according to headings in a table storing the particular type of data, and the faceted data is stored according to facets of the particular type of data. A set of facet names from the faceted data is mapped to a coordinate system on a user interface in order to assign each of the facet names to a predetermined area of a user interface. Facet values are associated with and mapped to the facet names in order to proximately display the facet values to their corresponding facet names according to the coordinate system.

17 Claims, 12 Drawing Sheets

(56) References Cited

U.S. PATENT DOCUMENTS

| | | | |
|---|---|---|---|
| 2012/0084328 A1* | 4/2012 | Ishikawa et al. | 707/805 |
| 2012/0166471 A1 | 6/2012 | Ramamurthy et al. | |
| 2013/0166547 A1* | 6/2013 | Pasumarthi et al. | 707/728 |

OTHER PUBLICATIONS

Ruger et al., Zoom Navigation Exploring Large Information and Application Spaces, ACM, AVI '96 Gubbio Italy, 1996, p. 40-48.*

O. Ben-Yitzhak et al., "Beyond Basic Faceted Search", WSDM'08 Proceedings of the International Conference on Web Search and Web Data Mining, Palo Alto, California, US, Feb. 11-12, 2008, pp. 33-43.

E. Dempsey et al., "Two- and Three Dimensional Visualization of National Weather Service Flood Forecasts Using ARCGIS" Proceedings of the 23rd Annual ESRI International User Conference, Jul. 7-11, 2003, pp. 1-15.

E. Oren et al., "Extending Faceted Navigation for RDF Data" The Semantic Web—ISWC 2006, Lecture Notes in Computer Science, 2006, vol. 4273/2006, pp. 559-572.

Anonymous, "Faceted Navigation", copyright 2010 Pilot Systems, pp. 1-2, http://burgers.demo.pilotsystems.net/@@faceted-navigation.

Complete Information Architecture, Inc., "Facetmap: Faceted Classification Software Tools," copyright 2009, pp. 1, http://facetmap.com.

Tower.com, Inc., "Tower.com: Buy Music CDs, DVDs, Blu-ray, Books, New Releases," copyright 2012, pp. 1-2, http://www.tower.com.

Beachhouse.com, "Beachhouse.com: Vacation Search," copyright 2012, pp. 1-2, http://www.beachhouse.com/search/index.asp.

Steven Noels, "Faceted Browser," retrieved Nov. 2, 2012, pp. 1-2, http://cocoondev.org/main/facetedBrowser/default.

CMS Review, "CMS Faceted Product Directory," retrieved Nov. 2, 2012, pp. 1, http://www.cmsreview.com/timelines/ShopFeatureDirectory.html?FeatureSetID=1&DirectoryIntroURL=http://www.cmsreview.com/HowTo/DirectoryIntro.html&DirectoryFootUrl=http://www.cmsreview.com/HowTo/DirectoryFoot.html&CSSURL=http://www.cmsreview.com/css/cmsreview.css.

R. Rao et al., "The Table Lens: Merging Graphical and Symbolic Representations in an Interactive Focus+Context Visualization for Tabular Information," Proceedings of CHI'94: Human Factors in Computing Systems, Boston, MA, Apr. 1994, pp. 318-322, 481-482.

Anonymous, "Online Analytical Processing," pp. 1-7, last modification on Oct. 16, 2012, http://en.wikipedia.org/wiki/Online_analytical_processing.

Marti Hearst, "Flamenco Fine Arts Search," retrieved Nov. 2, 2012, pp. 1, http://orange.sims.berkeley.edu/cgi-bin/flamenco.cgi/famuseum/Flamenco.

Google, "Google Maps," copyright 2012, pp. 1, retrieved Nov. 21, 2012, http://maps.google.com/.

U.S. Appl. No. 12/976,047—Final Office Action Mailed Dec. 20, 2013.

Y. Tzitzikas et al., "Extended Faceted Taxonomies for Web Catalogs", Proceedings of the 3rd International Conference on Web Information Systems Engineering (WISE'02), Dec. 11, 2002, pp. 1-10.

"YUI 2: Treeview" Yahoo! Developer Network, http://developer.yahoo.com/yui/treeview/, 2011.

"PYGTK 2.0 Tutorial: Chapter 14. Tree View Widget" http:/www.pygtk.org/pygtk2tutorial/ch-TreeViewWidget.html, Mar. 2, 2006.

J. Polowinski, "Widgets for Faceted Browsing", Human Interface and the Management of Information, Springer Berlin, 2009, pp. 601-610 (Abstract Only).

A. Marwick, "Faceted Navigation for Document Discovery" Feb. 14, 2008, pp. 1-17, http://www.ibm.com/developerworks/data/library/techarticle/dm-0802marwick/.

E. Stoica et al. "Automating Creation of Hierarchical Faceted Metadata Structures" , Human Language Technologies 2007: The Conference of the North American Chapter of the Association for Computational Linguistics; Proceedings of the Main Conference. Association for Computational Linguistics, pp. 244-251 (2007).

M. Graham et al., "A Survey of Multiple Tree Visualisation" Palgrave MacMillan Information Visualization 9, 235-252 (Winter 2010).

M. Mohammadi-Aragh et al., "Moiretrees: Visualization and Interaction for Multi-Hierarchical Data", Eurographics—IEEE VGTC Symposium on Visualization, 2005, pp. 1-9.

M. Weiland et al., "Facet Folders: Flexible Filter Hierarchies With Faceted Metadata", CHI 2008, Extended Abstracts on Human Factors in Computing Systems, pp. 3735-3740, ACM, New York, NY.

M. Hildebrand et al., "/Facet: A Browser for Heterogeneous Semantic Web Repositories", The Semantic Web—ISWC 2006, vol. 4273, pp. 272-285.

U.S. Appl. No. 12/976,047—Non-Final Office Action Mailed Mar. 26, 2012.

U.S. Appl. No. 12/976,047—Final Office Action Mailed Oct. 15, 2012.

U.S. Appl. No. 12/976,047—Non-Final Office Action Mailed Jun. 26, 2013.

U.S. Appl. No. 12/976,047—Non-Final Office Action Mailed Jun. 5, 2014.

* cited by examiner

| AUTHOR NAME | BOOK TITLE | GENRE |
|---|---|---|
| AUTHOR A | TITLE 1 | FICTION |
| AUTHOR B | TITLE 2 | NON-FICTION |
| AUTHOR C | TITLE 3 | NON-FICTION |
| AUTHOR B | TITLE 4 | |
| AUTHOR D | TITLE 5 | FICTION |

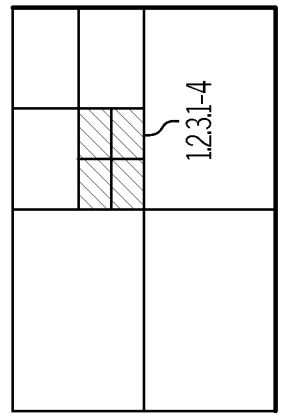
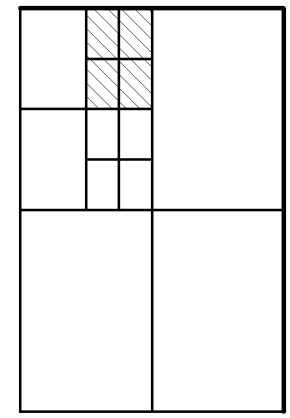
FIG. 11
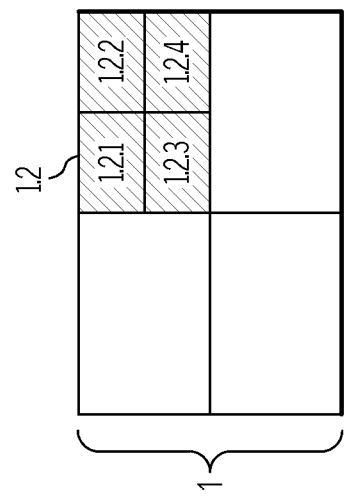
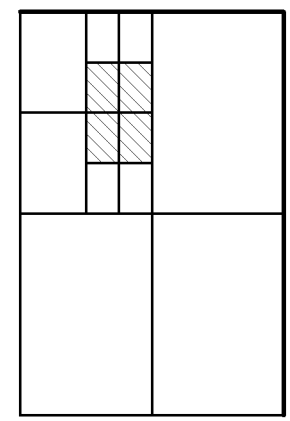
PAN 'RIGHT' OPERATION
FIG. 12

PRESENTING FACETED DATA ON A USER INTERFACE

BACKGROUND

The present disclosure relates to the field of computers, and specifically to the use of computers in managing data. Still more particularly, the present disclosure relates to the use of computers in displaying data on a user interface.

As more and more data is generated within and outside enterprises, user interfaces to facilitate a non-technical business user to navigate and select data from data sources are becoming increasingly important. Similarly, there is an increasing need for facilities to allow a non-technical business user to be able to consume this information, since typically the ratio of business users to IT users in an enterprise is high. Therefore, reliance of business users on an IT department to help them with consumption of this data for various situational needs is not a scalable and sustainable trend.

BRIEF SUMMARY

A computer implemented method, system and/or computer program product presents data on a user interface. Tabular data for a particular type of data is converted into faceted data. The tabular data is stored according to headings in a table storing the particular type of data, and the faceted data is stored according to facets of the particular type of data. A set of facet names from the faceted data is mapped to a coordinate system on a user interface in order to assign each of the facet names to a predetermined area of a user interface. Facet values are associated with and mapped to the facet names in order to proximately display the facet values to their corresponding facet names according to the coordinate system.

BRIEF DESCRIPTION OF THE SEVERAL VIEWS OF THE DRAWINGS

FIG. 2 illustrates a table of tabular data used in an exemplary embodiment of the present disclosure;

FIG. 11 illustrates exemplary results of zooming in on a facet;

FIG. 12 depicts tiles being adjusted upon panning operations; and

DETAILED DESCRIPTION

Figure 1:
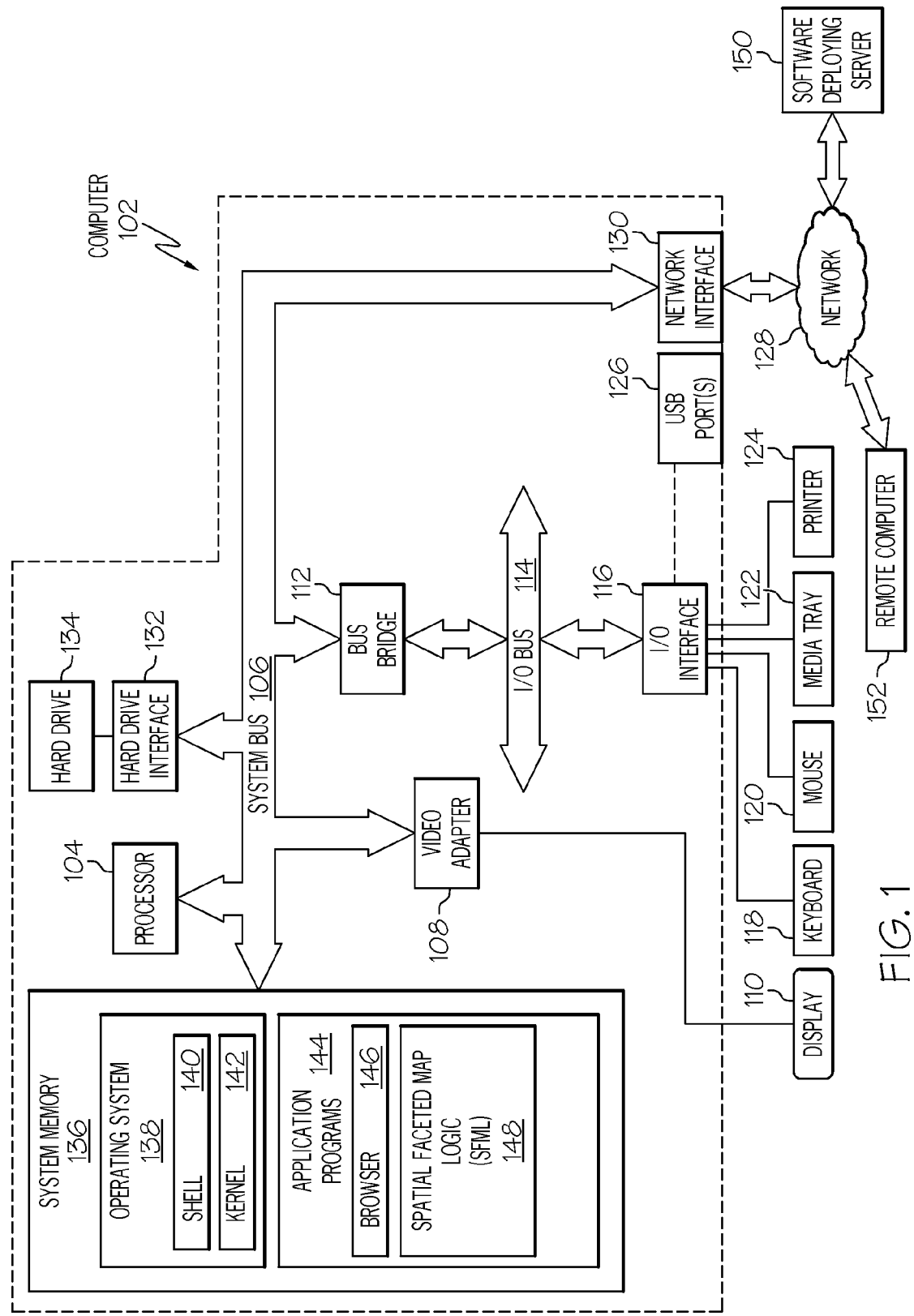
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, and/or a remote computer 152.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or a remote computer 152 using a network interface 130 to a network 128. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a spatial faceted map logic (SFML) 148. SFML 148 includes code for implementing the processes described below, including those described in FIGS. 2-8. In one embodiment, computer 102 is able to download SFML 148 from software deploying server 150, including in an on-demand basis, wherein the code in SFML 148 is not downloaded until needed for execution to define and/or implement the improved enterprise architecture described herein. Note further that, in one embodiment of the present invention, software deploying server 150 performs all of the functions associated with the present invention (including execution of SFML 148), thus freeing computer 102 from having to use its own internal computing resources to execute SFML 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

With reference now to FIG. 2, an exemplary table 200 of tabular data is shown. In accordance with the present disclosure, a set of tabular data such as that shown in table 200 is converted into faceted data, which is then spatially mapped onto a cartographic display, capable of presenting such data in an intuitive, navigable, zoomable manner.

Figure 3:
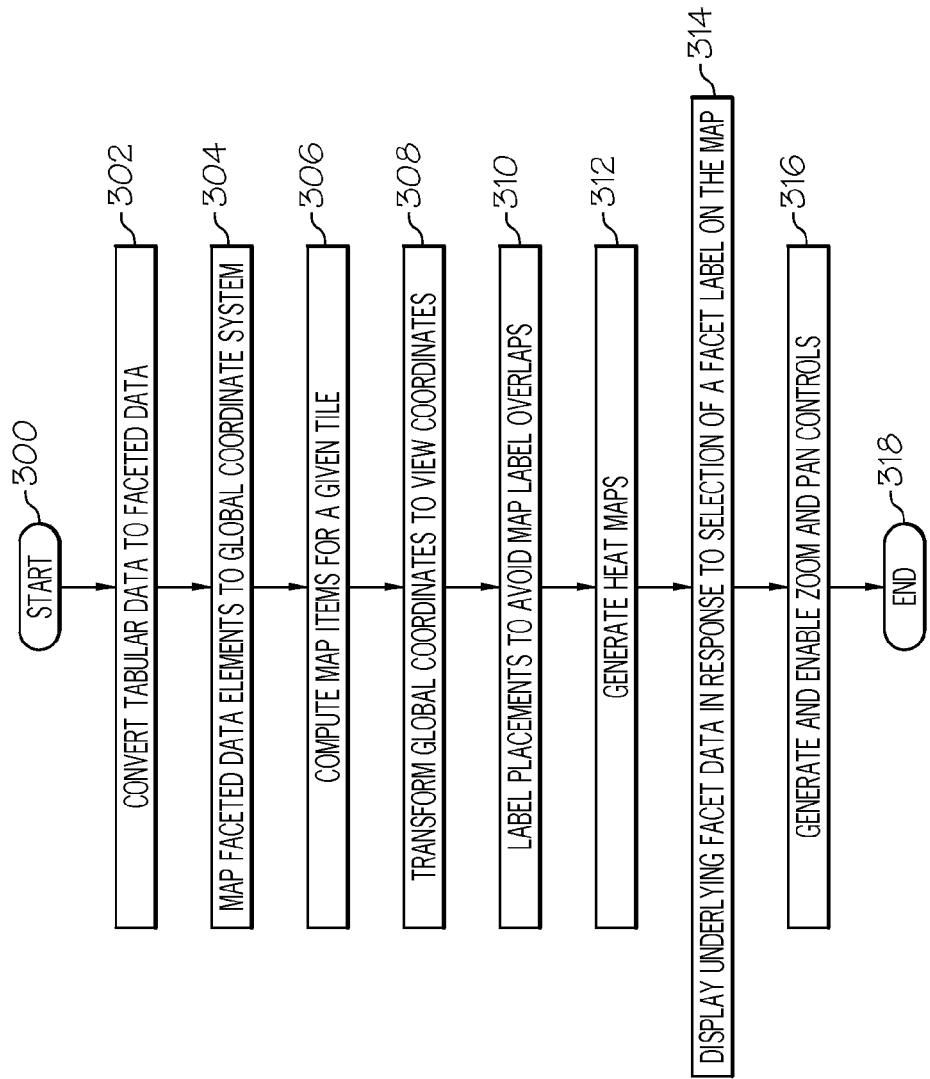
FIG. 3 is a high level flow chart of one or more exemplary steps performed by a computer to display tabular data in a two-dimensional spatial and faceted rendition.

With reference now to FIG. 3, a high level flow chart of one or more exemplary steps performed by a computer to display tabular data in a two-dimensional spatial and faceted rendition is presented. After initiator block 300, tabular data (such as that shown in FIG. 2) is converted into faceted data. Faceted data is defined as data that describes a collection of elements according to their attributes (facets). In the example shown in FIG. 2, the books (collection of elements) are arranged according to tabular data. However, this tabular data needs to be converted into faceted data. That is, the tabular data may or may not describe facets of the books, even though they happen to do so in table 200 shown in FIG. 2.

Thus, as described in block 302 in FIG. 3, the tabular data is converted into faceted data. Facet names, the corresponding unique set of values for each facet, the density of each facet value, and the density of the facet name are computed according to the following algorithm/pseudocode.

Input: A table of data containing rows, columns and column headers. Two arrays represent the input—a 1D array called headers, and a 2D array called cells is assumed to be provided.

Output: The following four data structures are provided as output:

facets: Gives the list of facets
facet_value_set: Gives the list of unique values for each facet
facet_score: Gives the accumulated score for each facet
facet_value_score: Gives the accumulated score for each value of each facet A facets array is then created. In the present example, the facets array is equal to the headers array [facets=headers] (although this is not necessarily the case). The following pseudocode creates the facets array:
Initialize facet_value_score data structure to zero values.
  Initialize facet_score data structure to zero values.
  Initialize facet_value_set data structure to empty sets.
  Iterate for each cell in cells array
  fnum=column number of the cell
  if (cell is not empty)
  facet_value_score(facets[fnum], cell_value)++
  facet_score(facets[fnum])++
  add cell_value to facet_value_set(facets[fnum])
Example:
Inputs
headers=[AuthorName, BookTitle, Genre]
cells=[Author A, Title 1, Fiction,
Author B, Title 2, Non-fiction,
Author C, Title 3, Non-fiction,
Author B, Title 4,
Author D, Title 5, Fiction]
facets=[AuthorName, BookTitle, Category]
facet_score(AuthorName)=5; facet_score(BookTitle)=5; facet_score(Category)=4
facet_value_set(AuthorName)={Author A, Author B, Author C, Author D}
facet_value_score(AuthorName, Author A)=1; facet_value_score(AuthorName, Author B)=2; facet_value_score(AuthorName, Author C)=1; facet_value_score(AuthorName, Author D)=1
facet_value_set(BookTitle)={Title 1, Title 2, Title 3, Title 4, The White Tiger}
facet_value_score(BookTitle, Title 1)=1; facet_value_score(BookTitle, Title 2)=1; facet_value_score(BookTitle, Title 3)=1; facet_value_score(BookTitle, Title 4)=1; facet_value_score(BookTitle, Title 5)=1 facet_value_set(Genre)={Fiction, Non-Fiction}
facet_value_score(Genre, Fiction)=2; facet_value_score(Genre, Non-Fiction)=2

As described in block 304 of in FIG. 3, the faceted data elements are then mapped to a global coordinate system. In this step, the output of the previous step (described in block 302) is used and a set of global coordinates is generated for each of the faceted data elements—i.e. for each of the facets and facet values. This is equivalent to plotting the faceted data elements of a 2D coordinate space. The following methodology/pseudocode describes this step:

Input: All the outputs of the step described in block 302.
Output: A table of information is generated, which is structured as follows in Table I:

TABLE I

| Map_Item_ID | Facet_ID | Global_X | Global_Y | Map_Label | Score |
|---|---|---|---|---|---|
| Unique ID for each Map Item | If the Map Item is a facet value, it points to its facet; NULL otherwise | X Coordinate of the Map Item in the Global Coordinate System | Y Coordinate of the Map Item in the Global Coordinate System | The Label for the Map Item that will be displayed on the Map | Score for the Map Item as computed in step shown in block 302 |

Method: The essence of this method is to take all facets and arrange them in a linear fashion on the 2D space in a left to right and top to bottom order. Around each facet, the values that correspond to the facet will be laid out. Buffer space around each value and around each facet is also given. This provides an approximate mapping of faceted data elements into a global coordinate system. The map cannot be rendered directly with these coordinates because there will be a lot of overlap of map labels since a fixed length of characters per map label is assumed. This is remedied by a further step of label placement after view coordinate mapping. The global coordinates therefore represent an approximate positioning of faceted data elements on a global coordinate system.

1. Initialize following variables:
1.1. facets_per_line (=6; could be read from a configuration file)
This configurable variable determines the number of facets occurring on a single line in the global system. In effect, this contributes to determining the width of the global system.
1.2. values_per_line (=4; could be read from a configuration file)
This configurable variable determines the number of values that can appear on a single line around each facet.
1.3. values_per_page (=50; could be read from a configuration file)
This configurable variable determines the number of values that can appear per facet on the map. This also determines the size of the map cache stored. Thus, the present disclosure presents zooming, panning, and pagination as navigational operators for browsing data on the map.
1.4. characters_per_map_item (=20; could be read from a configuration file)
This configurable variable is an estimate of the average number of characters for a single map item. This is used to space out the map labels on a global coordinate system. The larger this number, the less there will be an overlap of map labels in the view. However, the map labels on the map will become sparser and sparser as this value becomes greater.
1.5. unit_width (=1; could be read from a configuration file)
1.6. unit_height (=2; could be read from a configuration file)
Unit height and width of each character is taken as 1 in the global coordinate system. This also determines the spacing of map labels in the global system. However, depending on the font size available at the view, this can be scaled.

2. Compute following variables:
2.1. buffer_height=unit_height*4
2.2. buffer_width=unit_width*4
The buffers for height and width are to take the spacing between map labels into account so that a reasonable spacing happens in the global coordinate system. This is mainly to account for inter-line spacing that is required for map labels.
3. Initialize loop variables
3.1. current_X=0//determines the left corner of a facet block
3.2. current_Y=0//determines the top corner of a facet block
3.3. global_width=0 and global_height=0
3.4. current_column=0 and current_row=0
3.5. aid=0//indicates number of facets processed
3.6. id=0//map item id
4. Iterate for each facet in facets list
4.1. number_of_lines=facet_value_set(facet).length/values_per_line
4.2. block_height=(number_of_lines*unit_height)+buffer_height;
4.3. block_width=(values_per_line*characters_per_map_item*unit_width)+buffer_width
4.4. facet_X=current_X+block_width/2
4.5. facet_Y=current_Y+block_height/2
4.6. insert_into_map_table(id, NULL, facet_X, facet_Y, facet, facet_score(facet))
4.7. current_column=0 and current_row=0
4.8. facet_id=id
4.9. vid=0
4.10. Iterate for all value in facet_value_set(facet)
   4.10.1. id++
   4.10.2. (x', y')=getNextRowColumn//definition of method given later
   4.10.3. value_X=current_X+x'
   4.10.4. value_Y=current_Y+y'
   4.10.5. insert_into_map_table(id, facet_id, value_X, value_Y, value, facet_value_score(facet, value))
   4.10.6. vid++
4.11. id++
4.12. aid++
4.13. Compute new current_X and current_Y
   4.13.1. if ((aid mod attributes_per_line)=0)
      4.13.1.1. current_X=0
      4.13.1.2. current_Y+=block_height
      4.13.1.3. if (current_Y>global_height) global_height=current_Y 4.13.2. else
      4.13.2.1. current_X+=block_width
      4.13.2.2. if (current_X>global_width) global_width=current_X
The getNextRowColumn method used in the above step is provided below:
(x', y')=getNextRowColumn
   x'=((current_column−1)
      *characters_per_map_item*unit_width)+(characters_per_map_item/2*unit_width);
   y'=((current_row−1)*unit_height)+(unit_height/2); current_column=(current_column+1)mod values_per_line; current_row++;
return (x', y');
End getNextRowColumn
This algorithm results in the following output map table:

MAP TABLE II

| Map_Item_ID | Facet_ID | Global_X | Global_Y | Map_Label | Score |
|---|---|---|---|---|---|
| 0 | NULL | 50 | 1260 | AuthorNam | 5 |
| 1 | 0 | 25 | 1140 | Author A | 1 |
| 2 | 0 | 95 | 940 | Author B | 2 |
| 3 | 0 | 85 | 940 | Author C | 1 |
| 4 | 0 | 15 | 1340 | Author D | 1 |
| 5 | NULL | 80 | 4620 | BookTitle | 5 |
| 6 | 5 | 35 | 4700 | Title 1 | 1 |
| 7 | 5 | 135 | 4900 | Title 2 | 1 |
| 8 | 5 | 155 | 4700 | Title 3 | 1 |
| 9 | 5 | 45 | 4900 | Title 4 | 1 |
| 10 | 5 | 145 | 4700 | Title 5 | 1 |
| 11 | NULL | 185 | 2940 | Genre | 4 |
| 12 | 11 | 175 | 3020 | Fiction | 2 |
| 13 | 11 | 175 | 3220 | Non-Fiction | 2 |

Figure 4:
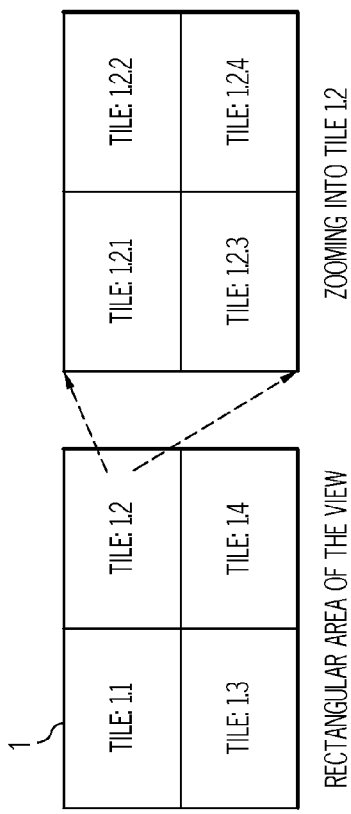
FIG. 4 presents an exemplary embodiment of partitioned tiles.

As described in block 306 of FIG. 3, map items for a given tile (section of the user interface) are then computed. Note that before proceeding to outline the tile algorithm, the map is rendered on a view in terms of tiles. The zoom level and pan position determine the tiles from the global coordinate system that need to be retrieved and rendered. In one embodiment, a rectangular view region is broken up into four equal parts, thus calling each part a tile. In one embodiment, the tiles are numbered. FIG. 4 shows how the tiles are partitioned and numbered for a view that is looking at the global system at zoom level 0 (no zoom). Also shown in the same diagram is when a particular tile (1.2) is zoomed into, further partitioning into smaller tiles (1.2.1-4) occurs. The corresponding numbering is also shown. Note that the entire global space is seen as a single tile numbered 1. Note further that the mapping results in certain areas of a user interface being reserved for certain facets, as depicted and described below in FIG. 8.

In this manner, we can expect to see tiles with numbers 1.1.2.3 or 1.3.4.1 and so on. The method described in this step tells how to compute the set of map items from the global coordinate space that will fall into the specified tile. Once these map items are known, then the global coordinates are converted into view coordinates, as described below in block 308.

Figure 5:
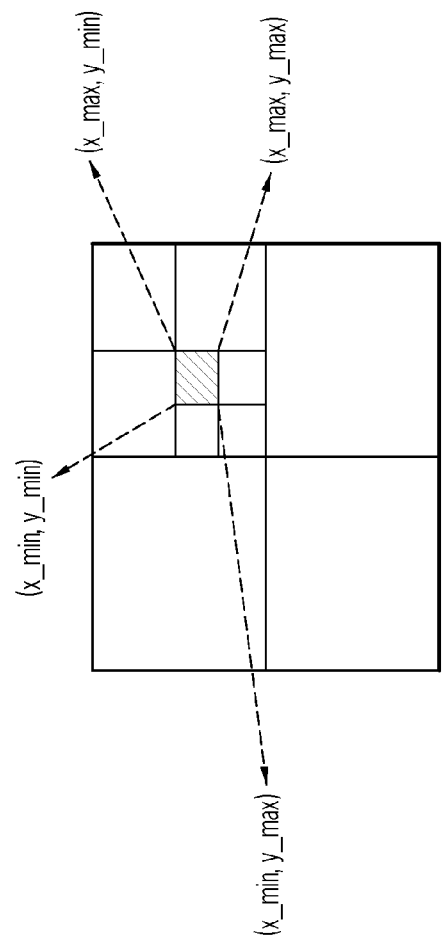
FIG. 5 illustrates boundary coordinate values of a partitioned tile.

The essence of the step described in block 306 is to compute the boundary coordinate values for a given file in the global coordinate system. Subsequently, from the table output of the step described in block 304, those map items that fall within the boundary values computed are removed. Computation of boundary values is performed according to the given tile numbering system. Exemplary boundary coordinate values of a tile is illustrated below:
(x_min, y_min)
Boundary Coordinate Values of the Tile 1.2.3.2 are illustrated in FIG. 5.

An exemplary outline and pseudocode for the process of block 306 to compute the map items within a given tile is presented as:
Input:
Tile ID (like 1.3.4.2)
Output of all previous steps available
Output:
List of map items from the computed Map Table of step 4.2 which fall within the specified tile
Method:
1. Split tile ID into its parts (separated by a dot)
2. Initialize variables:
   2.1. x_min=0; y_min=0; x_max=global_width; y_max=global_height 2.2. max_items_per_tile//a user configurable value to control the density of the map generated
3. Iterate for each part in tile parts
   3.1. switch based on part value
      3.1.1. case when part=1
         3.1.1.1. x_max=x_max/2;
         3.1.1.2. x_max=x_max+x_min/2;
         3.1.1.3. y_max=y_max/2;
         3.1.1.4. y_max=y_max+y_min/2;
      3.1.2. case when part=2
         3.1.2.1. x_min=x_min/2+x_max/2;
         3.1.2.2. y_max=y_max/2;
         3.1.2.3. y_max=y_max+y_min/2;
      3.1.3. case when part=3
         3.1.3.1. y_min=y_min/2+y_max/2;
         3.1.3.2. x_max=x_max/2;
         3.1.3.3. x_max=x_max+x_min/2;
      3.1.4. case when part=4
         3.1.4.1. x_min=x_min/2+x_max/2;
         3.1.4.2. y_min=y_min/2+y_max/2;
4. Obtain rows from Map Table where
   4.1. Global_X>=x_min
   4.2. Global_Y>=y_min
   4.3. Global_X<=x_max
   4.4. Global_Y<=y_max Restrict number of results to max_items_per_tile
5. Return the identified rows
This results in the following Table III:

TABLE III

| Map_Item_ID | Facet_ID | Global_X | Global_Y | Map_IAa3el | Score |
|---|---|---|---|---|---|
| 0 | NULL | 50 | 1260 | AuthorName | 5 |
| 1 | 0 | 25 | 1140 | Author A | 1 |
| 2 | 0 | 95 | 940 | Author B | 2 |
| 3 | 0 | 85 | 940 | Author C | 1 |
| 5 | NULL | 80 | 4620 | BookTitle | 5 |
| 6 | 5 | 35 | 4700 | Title 1 | 1 |
| 8 | 5 | 155 | 4700 | Title 3 | 1 |
| 9 | 5 | 45 | 4900 | Title 4 | 1 |

4.4 Algorithm: Global Coordinate to View Coordinate Transformation

The Global_X and Global_Y values stored for each map item in the Map Table (output of step 4.2) represents coordinate values in an absolute global coordinate system. In one embodiment, when the map has to be rendered on a view, it is a widget in a UI (web UI or desktop app UI). In such cases, the size of the view determines how the global coordinates are mapped to view coordinates. The following method performs this action for a given tile.

Input:
All map items in a given tile with global coordinates, as produced by step 4.3. Explicitly, the following information is assumed to be available.
   A points array having X and Y values for each point
   Tile boundary values (globalx_min, globalx_max, globaly_min, globaly_max) for the tile in the global coordinate system.
   Tile boundary values (viewx_min, viewx_max, viewy_min, viewy_max) for the tile in the global coordinate system. These are computed based on tile number (1, 2, 3 or 4) of the view.
   View variables like view_width and view_height are assumed to be available.
Output:
View coordinates for each map item provided in input Method:
1. Compute scaling factors
   1.1. scalex=(viewx_max−viewx_min)/(globalx_max−globalx_min)
   1.2. scaley=(viewy_max−viewy_min)/(globaly_max−globaly_min)
2. Iterate for each point in points array
   2.1. Normalize global coordinates
      2.1.1. newX=point.X−globalx_min;
      2.1.2. newY=point.Y−globaly_min;
   2.2. Scale
      2.2.1. newX=newX*scalex;
      2.2.2. newY=newY*scaley;
   2.3. Translate
      2.3.1. newX=newX+viewx_min;
      2.3.2. newY=newY+viewy_min;
   2.4. Store newx and newy as view coordinates
Example:
Inputs:
globalx_min=30
globalx_max=160
globaly_min=900
globaly_max=4950
viewx_min=80
viewx_max=120
viewy_min=80
viewy_max=240
Thus, the inputs in TABLE IV:

TABLE IV

| X | Y | Map_Label |
|---|---|---|
| 50 | 1260 | AuthorName |
| 25 | 1140 | Author A |
| 95 | 940 | Author B |
| 85 | 940 | Author C |
| 80 | 4620 | BookTitle |
| 35 | 4700 | Title 1 |
| 155 | 4700 | Title 3 |
| 45 | 4900 | Title 4 | result in the output of TABLE V:

TABLE V

| View_X | View_Y | Map_Label |
|---|---|---|
| 86 | 94 | AuthorName |
| 79 | 90 | Author A |
| 100 | 82 | Author B |
| 97 | 82 | Author C |
| 95 | 227 | BookTitle |
| 82 | 230 | Title 1 |
| 118 | 230 | Title 3 |
| 85 | 238 | Title 4 |

Figure 6:
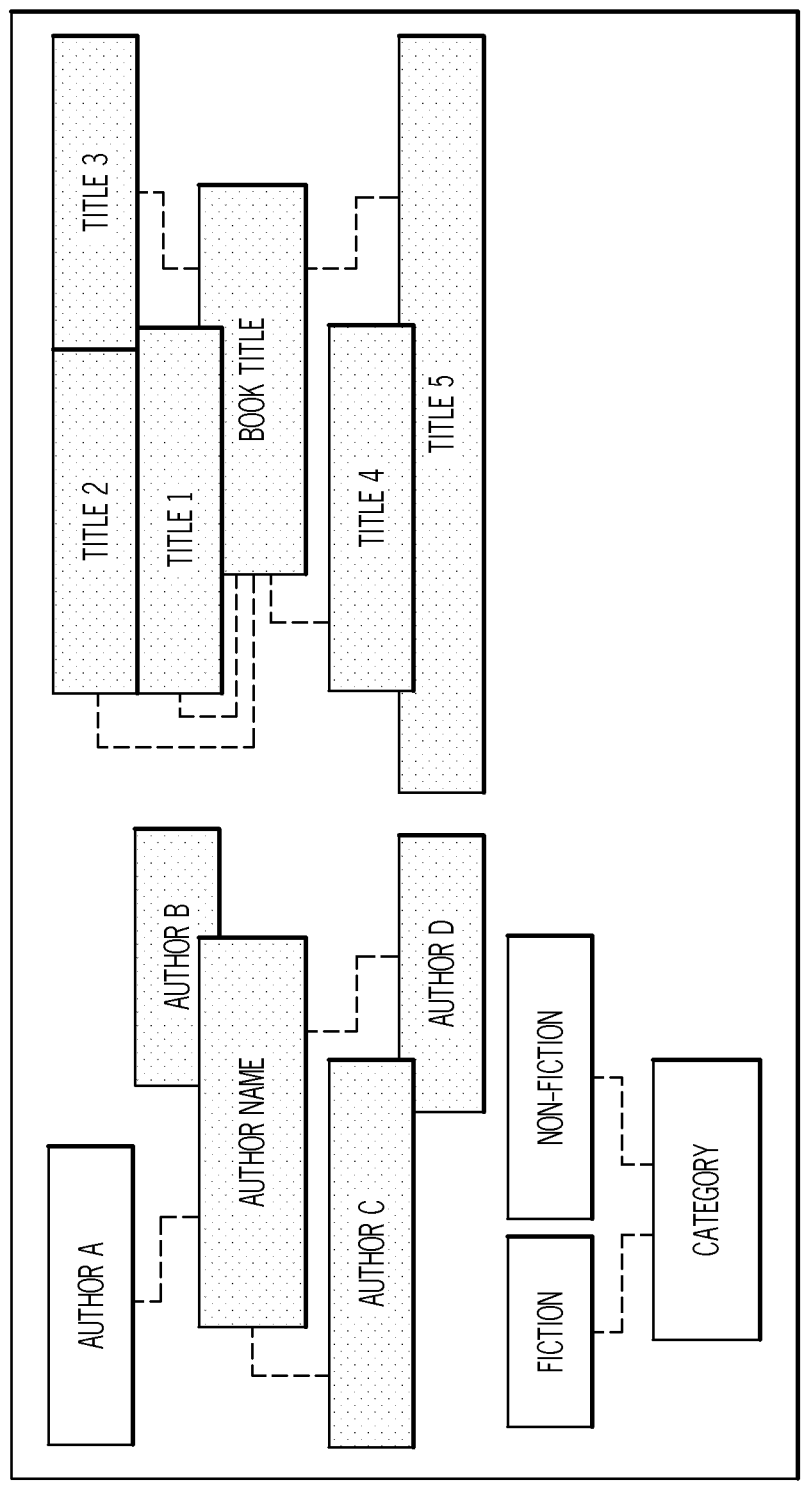
FIG. 6 depicts map labels having unwanted label overlap.

With reference now to block 310 in FIG. 3, a label placement algorithm is executed in order to avoid map label overlaps. This step solves the problem of label overlap. After the map items in the tile are computed and their global coordinates retrieved, they are mapped to view coordinates as outlined by the steps described herein. Once the view coordinates for each map item are obtained, the labels are plotted on the view canvas by using the score values to determine the font sizes. The font sizes will be within prescribed configurable limits, and scaled according to the scores of the map items. After these labels are plotted on the view canvas, there might be overlaps between the map labels as shown in FIG. 6. The following algorithm addresses and corrects this problem:

Input:
The set of map labels along with its scores and view coordinates.
  max_iterations: Max number of iterations (user configurable parameter)
Output:
New locations (view coordinates) for all the labels, with minimized overlapping.

Figure 7:
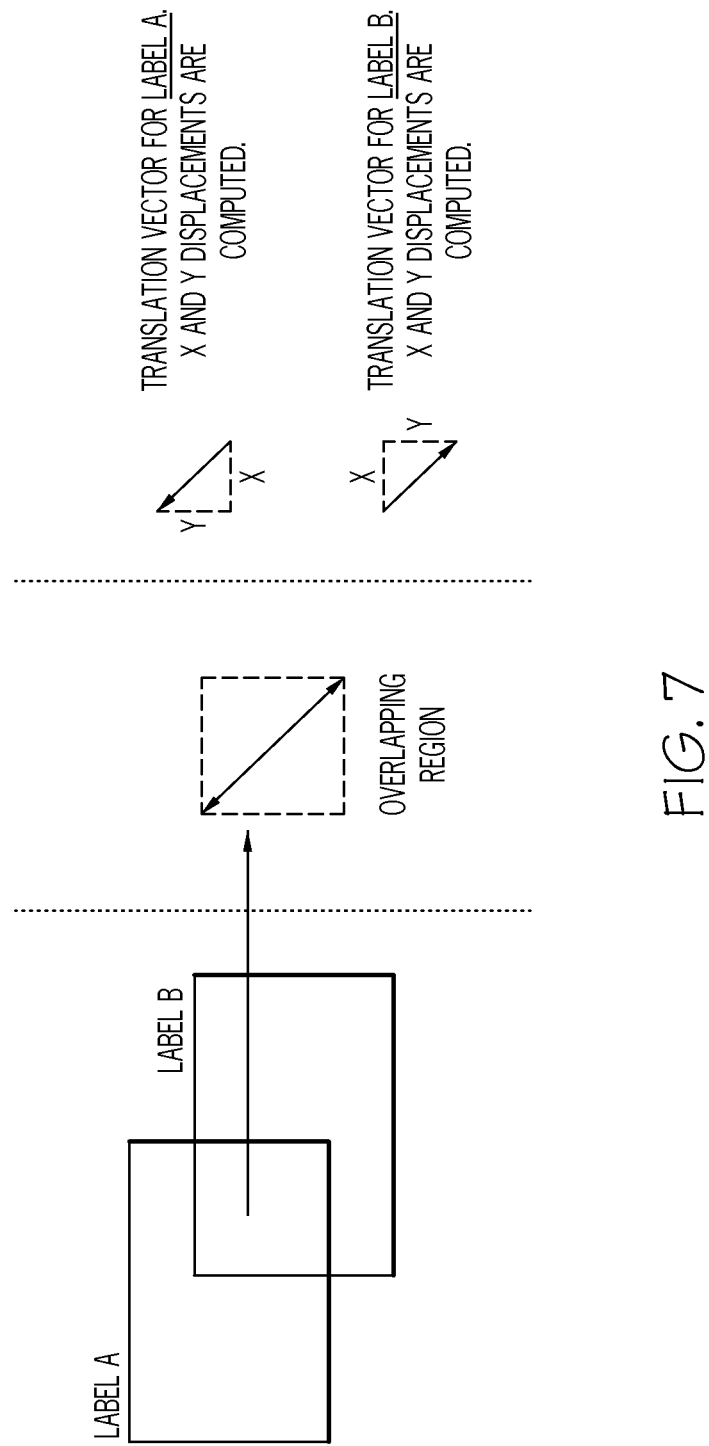
FIG. 7 illustrates realignment of map labels.

Method: A summary of the method to compute translation vectors is provided here. This is computed by establishing the overlap between a pair of labels, and generating a pair of vectors with opposite directions, which if applied as translation vectors on the labels will result in no overlap. FIG. 7 illustrates this process for two labels. Note that this operation is performed for all labels in single iteration, and there can be several such iterations before no overlap results, or the method exits having reached the maximum number of iterations configured by the user.

Exemplary pseudocode for this step is:
1. Iterate for max_iterations times
    1.1. For each label in the list
        1.1.1. Compute the overlaps between every pair of labels.
        1.1.2. If there is any overlap, compute the translation vectors. These translation vectors indicate how much and in what direction a label should move in order to avoid overlap.
    1.2. Apply the computed translations to every label. This results in new view coordinates for the label.
    1.3. Compute the overlaps again. If there are no overlaps, break from this loop.
2. Draw the newly positioned labels on the view Once this procedure is complete, there will be better positioning of map labels on the view.

Figure 8:
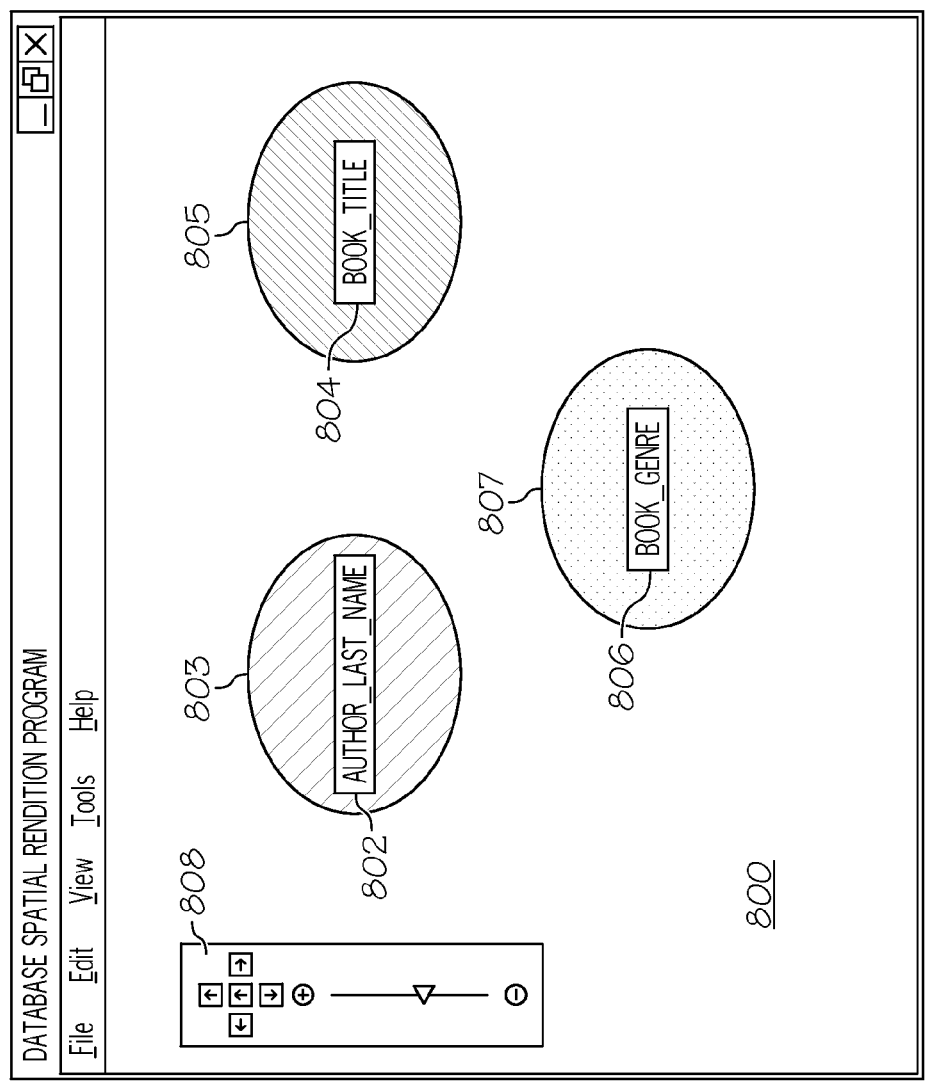
FIG. 8 depicts heat maps on a user interface.

As described in block 312, a heat map is generated for each facet. In one embodiment, this entails drawing an appropriately shaded area (e.g., a shaded circle) underneath each facet label. The heat map may be depicted by 1) shading, 2) shape, and/or 3) radiant coloring. For example, a larger heat map may indicate more facet data than a smaller (e.g., smaller radius) heat map. For illustrative purposes, such heat maps are depicted in an exemplary cartographic data rendition screen 800, as shown in FIG. 8 as heat maps 803, 805, 807, each of which has a distinctive shading. That is, for every map label (e.g., elements 802, 804, 806), a heat map such as a circle (corresponding elements 803, 805, 807) is drawn underneath it on the map canvas whose shading corresponds to the score of the map item. During the rendering of the map, a color gradient list is consulted. This gradient scheme can point to lighter colors for lower pixel values, and darker (or redder) colors for higher pixel values thus indicating density of information. Thus, the shading indicates in FIG. 8 that there are more entries under the facet Book_Title (5) than there are for Author_Last_Name (4) and Book_Genre (2). In another embodiment, the radius corresponds to the score of the map item. Note that in one embodiment each map label (802, 804, 806) for the different facets is displayed in an area of the cartographic data rendition screen 800 that is reserved for such facets. This allows a user to intuitively and instinctively know which area of the cartographic data rendition screen 800 to look at in order to locate the desired facet data. Note that the heat maps 803-805 are shown as having various levels of shading according to their heat levels. In one embodiment, however, the heat maps are actually gradient filled (getting lighter as they radiate away from a map label), such that the level of gradient and size of the heat map indicate the level of heat.

Every pixel of the circle that is drawn is given a value between 0 and 255 depending on the score of the map item. The value for a pixel of a single heat-map circle is additive in nature. That is, the value between 0 and 255 gets added to the already existing value of that pixel. This takes care of blending into overlapping circles. For example, if two heat maps overlap, this blending will indicate how much overlap is occurring between two heat maps.

Figure 9:
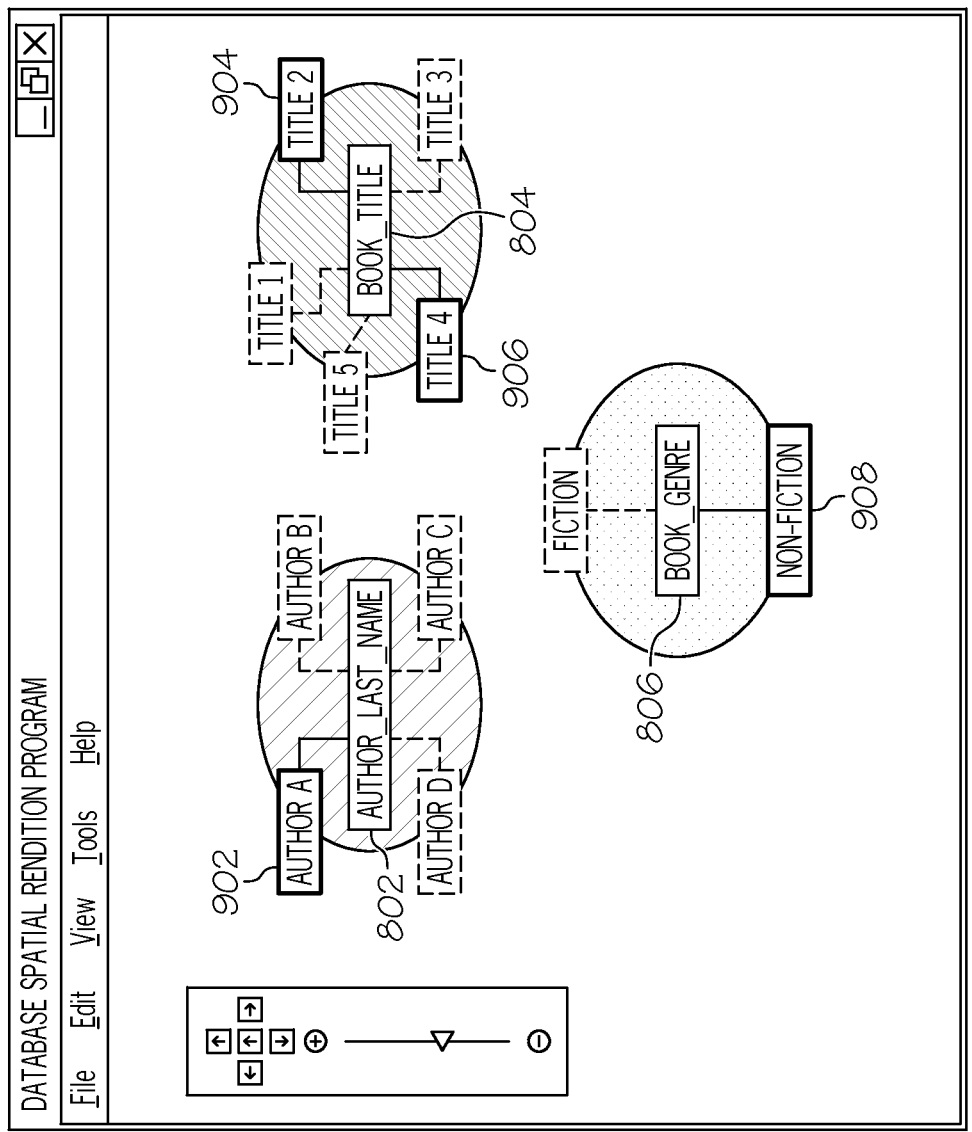
FIG. 9 illustrates facet values being displayed on a user interface.

As depicted in FIG. 9, and as described in block 314 of FIG. 3, clicking each of the facets 802, 804, 806 results in the underlying data for that facet being displayed (Authors A-D; Titles 1-5; Fiction/Non-Fiction). Note that the underlying data can be displayed in alphabetical order, either from top to bottom, or clockwise around each facet (as depicted). In one embodiment, the process ends there. That is, rather than attempt to clutter the cartographic map with other information, the user is simply shows which facet has the greatest entries, thus allowing a review of those entries. While the example shown in FIG. 9 suggests that it would be easy to look at all facet data entries, in other embodiments there may be too many (scores, thousands, millions) data entries associated with a particular facet. Thus, the user is directed to clicking on only facets that the heat map indicates has a manageable number of facet data entries. For example, if the heat map for the facet Book_Title was very dark/large, then the user would know intuitively that clicking it would reveal too many overlapping titles. Thus, clicking the facet Book_Genre, which has a lighter/smaller heat map, will result in data that is easier to navigate.

Note that in one embodiment, only a predetermined subset of the facet values are displayed. For example, if the user clicked element 802, then only Authors A and B might be selected, in order to avoid clutter. The selection of which facet values are to be displayed may be based on a particular user's past history with this or a similar user interface, the most popular authors (i.e., the least obscure according to publication history), a match to a characteristic of the user (i.e., if a user identification reveals that the user is a history professor, then only non-fiction authors known to write about history may be revealed on the user interface), etc.

Figure 10:
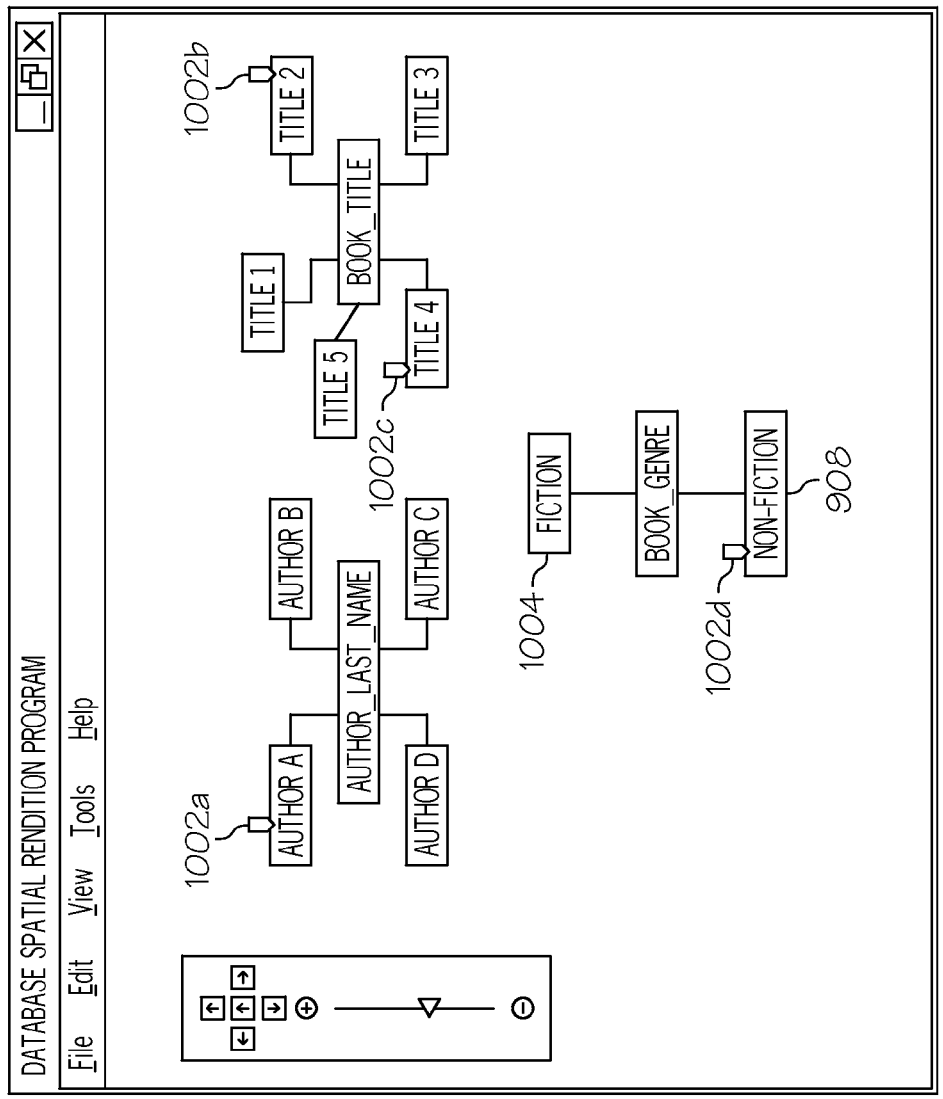
FIG. 10 depicts push-pin indicators showing a highlighted history of searched elements.

In another embodiment, clicking a data block such as author data block 902 results in the automatic highlighting of corresponding title data blocks 904 and 906, as well as genre data block 908. This highlighting can be tabbed with push-pin indicators 1002a-d, as shown in FIG. 10. This history of the user's search can then be saved, transmitted to another party, etc., either with or without the un-tabbed data blocks. That is, the push-pin indicators 1002a-d show facet names and/or values that have been searched for by the user.

As described in block 316 of FIG. 3, zoom and pan controls are generated and enabled for the cartographic data rendition screen 800 shown in FIG. 8. This allows a user to pan and zoom using the same types of controls found in a geographic map. That is, using the pan and zoom control 808 shown in FIG. 8, a user can pan over to a particular facet label, and then zoom into that label in order to see more granular information about that facet. Such zooming can be accomplished by using a scroll wheel, zoom windows, etc. when focus is on top of the particular facet.

Figure 13:
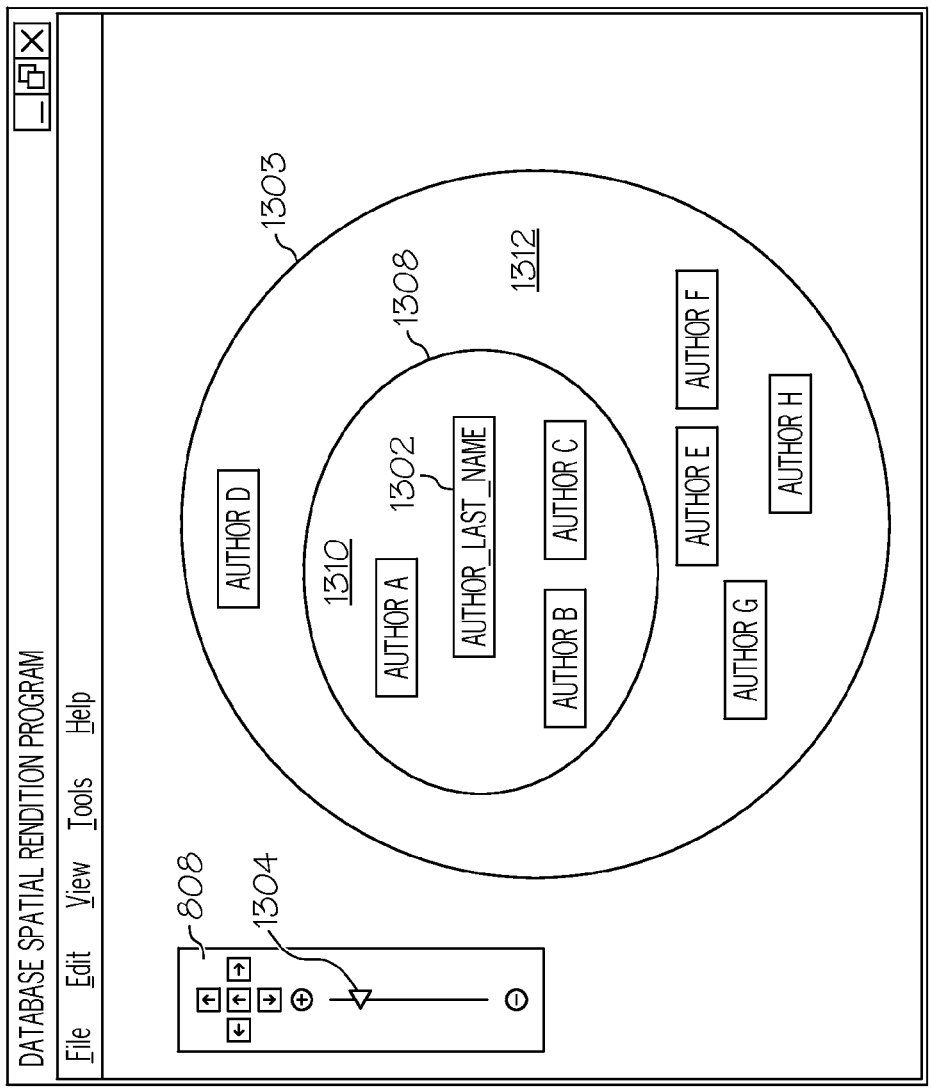
FIGS. 13-14 illustrate additional exemplary results of zooming in on a region of the user interface.

With reference now to FIG. 13, in one embodiment pan and zoom controls allow a user to zoom in on a particular facet. That is, at the high level view shown in FIG. 8, only facet names are shown, without any facet values. However, in FIG. 13, the heat map 1303 (which is a zoomed-in version of heat map 803 shown in FIG. 8) allows the user to see various facet values (Authors A-H) that are associated with the facet 1302. These facet values are derived from a database or an XML document, which may have large amounts of data. This data is viewed as faceted data, in which a data model projects information as facet names (attributes) and facet values (attribute values) only. Note that there is no hierarchy to the data initially, such that input to the user interface 1300 is initially a large quantity of facet names and values derived out of tabular data. That is, the data is not hierarchical in that one data does not depend on, is not a subset of, nor is a child of another data. Rather, each piece of facet data (facet data element) is independent of other facet data elements. However, the facet data can be classified according to its importance relative to other facet data. This relative importance can be based on how often specific data is found in a database, how often a user has retrieved/requested/viewed the specific data in the past, etc. The present disclosure allows the display of these facet names and facet values in a zoomable, pannable navigation interface.

Consider, as an example, that there are about 100,000 facet names and on an average each of these have about 100 values. This means that there are a hundred thousand facet names (attributes) and a million values that go with it. Each of these million and a hundred thousand elements become map-elements. Note that the term "map-element" refers to both facet names and facet values. However, in FIG. 8 (and even FIG. 13), all these map-elements cannot be displayed on a single screen. There, the present disclosure maps these map-elements into a virtual and large canvas/map, to which (x,y) coordinates are assigned.

In one embodiment, the relative importance of each of these map-elements is computed with respect to each other. In this embodiment, the mapping occurs by observing the number of times a map element occurs in the data corpus. This frequency is used as a score used to determine how important a particular map-element is. Once this is accomplished, the user is allowed to initially view the entire map in one shot (outer most zoom level). In this zoom level, only a few (e.g., up to 100) map-elements are visible. However, the user sees the 100 most important elements. Next, the user is given a clue about where the other elements are through the heat map. Hotter areas within circle 1308 (1310, which may be color coded in a gradient manner as red) have more map-elements in it and will be visible if one zooms in that region. Colder areas outside of circle 1308 (1312, which may be color coded in a gradient manner as blue) will have a smaller number of map elements. As one zooms into different regions, less important (as per our computed score) map-elements surface up (come to the surface) and the user can view these. Thus, zooming in on area 1310 will not only show Authors A-C, but other authors facets/values (e.g., Authors I-L—not shown), while Authors D-H will disappear after the zooming action. That is, by zooming in on a color-coded hot spot, additional facet values for the facet 1302 will appear on the user interface 1300. Thus, this zoom-pan navigation divulges more detail as the user zooms in, showing more important facets at outer levels of zoom, and less important facets at zoomed in levels.

Figure 14:
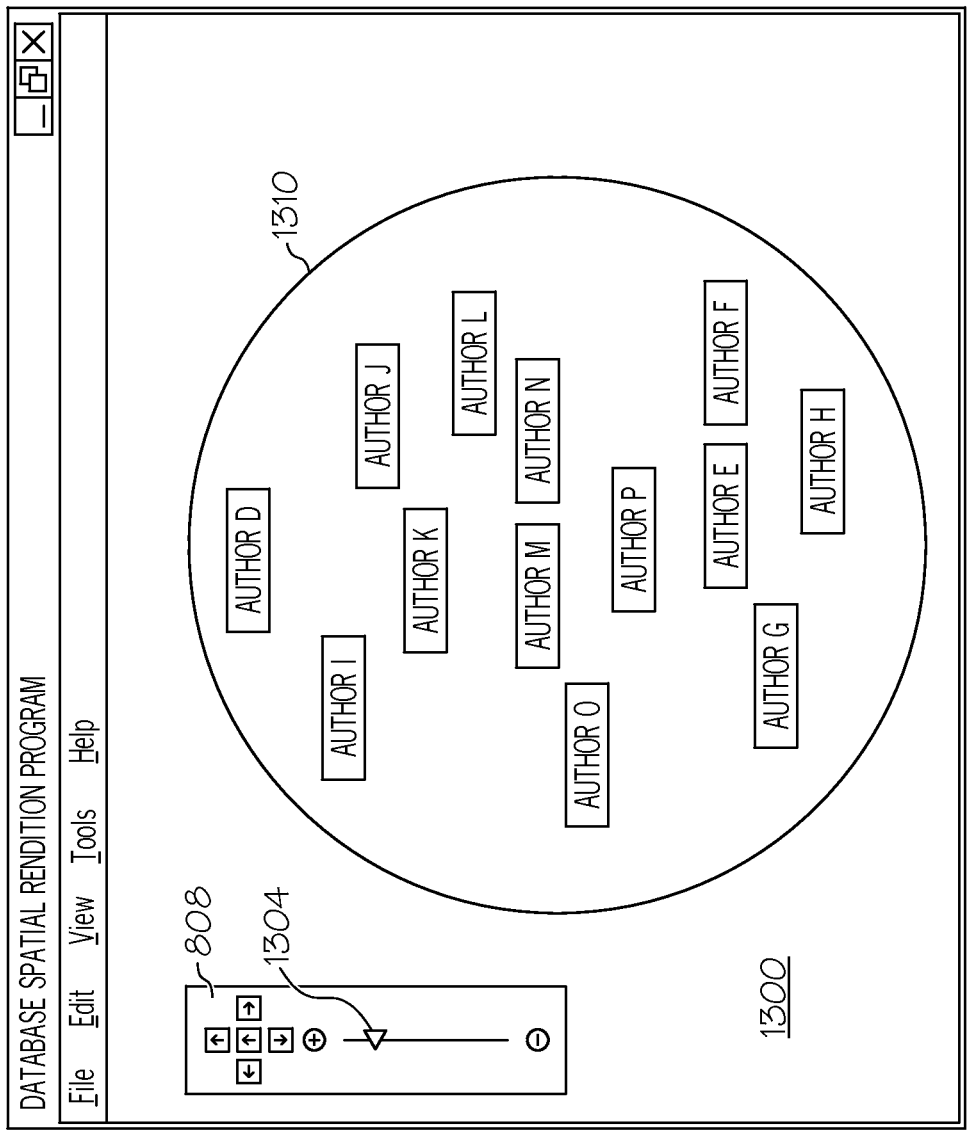

In another embodiment, area 1310 initially displays the most important facet values (Author A-C), as determined by their high frequency in a database, a past history of accessing these facet values by a particular user, and/or other criteria. By zooming in on area 1310, other less important facet values (e.g. Authors D-H) replace the more important facet values (Author A-C) shown on the user interface 1300. That is, as shown in FIG. 14, assume that the user has zoomed in on area 1310. The user is not able to see less important facet values (e.g., Authors D-H as well as Authors I-P). Thus, as the user zooms in on an area of the user interface 1300, more and more less significant facets and/or facet values become visible.

As depicted in FIG. 11, zooming results in a change of the current tiles being viewed. For example, if the tile 1.2.3 is zoomed into, the resulting tiles in the view would be 1.2.3.1, 1.2.3.2, 1.2.3.3 and 1.2.3.4. The map engine then runs through the steps described above (blocks 304-314) and redraws the map for the new zoom level indicated.

Similarly, panning results in a change in the tiles being viewed. For example, as depicted in FIG. 12, if the current set of tiles being viewed (four at a time) are 1.2.3.2, 1.2.4.1, 1.2.3.4 and 1.2.4.3 and if there is a pan right operation, the resulting tiles in the view will be 1.2.4.1, 1.2.4.2, 1.2.4.3 and 1.2.4.4.

As depicted in FIG. 13, assume that a user has panned over block 1004 in FIG. 10. This element is the sub-facet block for "Fiction" books in the tabular database. By zooming in on block 1004, as suggested by the repositioning of the zoom arrow 1304 in the n and zoom control 808, the user now is able to see additional information (title, author, publication data, country of origin, literary genre, etc.) about the three fiction books found in the "Fiction" block of data. Zooming in on any of the three Titles displayed may result in additional data about the sub-facets depicted. Thus, scanning to (e.g., through use of a cursor control) and zooming in (e.g., through use of a scroll wheel) on a particular area of the user interface (e.g., the region of the map depicting data relationships) allows additional detail of the data map to be revealed.

As described herein, the present disclosure presents a method and system for mapping tabular data to a 2D spatial coordinate system in a faceted manner (i.e. having facets and facet values). Furthermore, information about mapping to global coordinate system, tiling of global space, global coordinate to view coordinate mapping, label placement and other operations have been outlined. Selection of data in such an interface is also discussed.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method for presenting data on a user interface, the method comprising:
    a processor converting tabular data for a particular type of data into faceted data, wherein the tabular data is comprised of a collection of elements arranged using categorical descriptors, wherein the faceted data is comprised of facets based on the categorical descriptors and facet values found in the collection of elements that correspond to each facet, and wherein the tabular data is converted into the faceted data by associating each element in the tabular data with one or more of the facet values;
    the processor mapping a set of facets to a coordinate system on a user interface in order to assign each of the facets to a facet tile comprising a predetermined area of the user interface, wherein each facet tile is associated with multiple facet values that describe the specific facet;
    the processor determining a facet score for each of the facet values, wherein the facet score is based on a frequency of a facet value appearing in the tabular data;
    the processor initially displaying more significant facet values within each facet tile based on a user's history of viewing the facet values;
    the processor, in response to detecting a zooming in on a specific facet tile on the user interface, replacing more significant facet values with less significant facet values that are associated with the specific facet tile as determined by facet values' facet scores, such that more significant facet values have a history of occurring more frequently in the tabular data than the less significant facet values; and
    the processor displaying the less significant facet values on the user interface.

2. The method of claim 1, further comprising:
    the processor, in response to detecting a panning of a zoomed in specific facet tile, realigning displayed less significant facet values in order to display different facet values in a single pane.

3. The method of claim 1, further comprising:
    the processor generating and displaying on the user interface a heat map for each set of facet values, wherein the heat map provides a background visual cue that describes a quantity of elements associated with each set of facet values.

4. The method of claim 1, further comprising:
    the processor associating multiple facet values to a single facet;
    the processor identifying multiple facets on the user interface that have less than a predefined quantity of associated multiple facet values; and
    the processor, in response to detecting that a selected facet, from the multiple facets that have less than the predefined quantity of associated multiple facet values, has been selected from the user interface by a user, highlighting other facet values that are associated with the selected facet.

5. The method of claim 4, further comprising:
    the processor storing a record of highlighted said other facet values; and
    transmitting the record to a second user.

6. The method of claim 1, further comprising:
    displaying only a predefined set of facet values related to a selected facet according to known characteristics for a user that activated the selected facet.

7. A computer program product for presenting data on a user interface, the computer program product comprising:
    a computer readable storage media;
    first program instructions to convert tabular data for a particular type of data into faceted data, wherein the tabular data is comprised of a collection of elements arranged using categorical descriptors, wherein the faceted data is comprised of facets based on the categorical descriptors and facet values found in the collection of elements that correspond to each facet, and wherein the tabular data is converted into the faceted data by associating each element in the tabular data with one or more of the facet values;
    second program instructions to map a set of facets to a coordinate system on a user interface in order to assign each of the facets to a facet tile comprising a predetermined area of the user interface, wherein each facet tile is associated with multiple facet values that describe the specific facet;
    third program instructions to determine a facet score for each of the facet values, wherein the facet score is based on a frequency of a facet value appearing in the tabular data;
    fourth program instructions to initially display more significant facet values within each facet tile based on a user's history of viewing the facet values;
    fifth program instructions to, in response to detecting a zooming in on a specific facet tile on the user interface, replace more significant facet values with less significant facet values that are associated with the specific facet tile as determined by facet values' facet scores, such that more significant facet values have a history of occurring more frequently in the tabular data than the less significant facet values; and
    sixth program instructions to display the less significant facet values on the user interface; and wherein the first, second, third, fourth, fifth, and sixth program instructions are stored on the computer readable storage media.

8. The computer program product of claim 7, further comprising:
seventh program instructions to, in response to detecting a panning of a zoomed in specific facet tile, realign displayed less significant facet values in order to display different facet values in a single pane; and wherein
the seventh program instructions are stored on the computer readable storage media.

9. The computer program product of claim 7, further comprising:
seventh program instructions to generate and display on the user interface a heat map for each set of facet values, wherein the heat map provides a background visual cue that describes a quantity of elements associated with each set of facet values; and wherein
the seventh program instructions are stored on the computer readable storage media.

10. The computer program product of claim 7, further comprising:
seventh program instructions to associate multiple facet values with a single facet;
eighth program instructions to identify multiple facets on the user interface that have less than a predefined quantity of associated multiple facet values; and
ninth program instructions to, in response to detecting that a selected facet, from the multiple facets on the user interface that have less than the predefined quantity of associated multiple facet values, has been selected from the user interface by a user, highlight other facet values that are associated with the selected facet; and wherein
the seventh, eighth, and ninth program instructions are stored on the computer readable storage media.

11. The computer program product of claim 10, further comprising:
tenth program instructions to store a record of highlighted facet values; and
eleventh program instructions to transmit the record to a second user; and wherein the tenth and eleventh program instructions are stored on the computer readable storage media.

12. The computer program product of claim 7, further comprising:
seventh program instructions to display only a predefined set of facet values related to a selected facet according to known characteristics for a user that activated the selected facet; and wherein
the seventh program instructions are stored on the computer readable storage media.

13. A computer system comprising:
a central processing unit (CPU), a computer readable memory, and a computer readable storage device;
first program instructions to convert tabular data for a particular type of data into faceted data wherein the tabular data is comprised of a collection of elements arranged using categorical descriptors, wherein the faceted data is comprised of facets based on the categorical descriptors and facet values found in the collection of elements that correspond to each facet, and wherein the tabular data is converted into the faceted data by associating each element in the tabular data with one or more of the facet values;
second program instructions to map a set of facets to a coordinate system on a user interface in order to assign each of the facets to a facet tile comprising a predetermined area of the user interface, wherein each facet tile is associated with multiple facet values that describe the specific facet;
third program instructions to determine a facet score for each of the facet values, wherein the facet score is based on a frequency of a facet value appearing in the tabular data;
fourth program instructions to initially display more significant facet values within each facet tile based on a user's history of viewing the facet values;
fifth program instructions to, in response to detecting a zooming in on a specific facet tile on the user interface, replace more significant facet values with less significant facet values that are associated with the specific facet tile as determined by facet values' facet scores, such that more significant facet values have a history of occurring more frequently in the tabular data than the less significant facet values; and
sixth program instructions to display the less significant facet values on the user interface; and wherein
the first, second, third, fourth, fifth, and sixth program instructions are stored on the computer readable storage media for execution by the CPU via the computer readable memory.

14. The computer system of claim 13, further comprising:
seventh program instructions to, in response to detecting a panning of a zoomed in specific facet tile, realign displayed less significant facet values in order to display different facet values in a single pane; and wherein
the seventh program instructions are stored on the computer readable storage media for execution by the CPU via the computer readable memory.

15. The computer system of claim 13, further comprising:
seventh program instructions to generate and display on the user interface a heat map for each set of facet values, wherein the heat map provides a background visual cue that describes a quantity of elements associated with each set of facet values; and wherein
the seventh program instructions are stored on the computer readable storage media for execution by the CPU via the computer readable memory.

16. The computer system of claim 13, further comprising:
seventh program instructions to associate multiple facet values with a single facet;
eighth program instructions to identify multiple facets on the user interface that have less than a predefined quantity of associated multiple facet values; and
ninth program instructions to, in response to detecting that a selected facet, from the multiple facets on the user interface that have less than the predefined quantity of associated multiple facet values, has been selected from the user interface by a user, highlight other facet values that are associated with the selected facet; and wherein
the seventh, eighth, and ninth program instructions are stored on the computer readable storage media for execution by the CPU via the computer readable memory.

17. The computer system of claim 13, further comprising:
seventh program instructions to display only a predefined set of facet values related to a selected facet according to known characteristics for a user that activated the selected facet; and wherein
the seventh program instructions are stored on the computer readable storage media.

* * * * *